United States Patent Office 3,381,453
Patented May 7, 1968

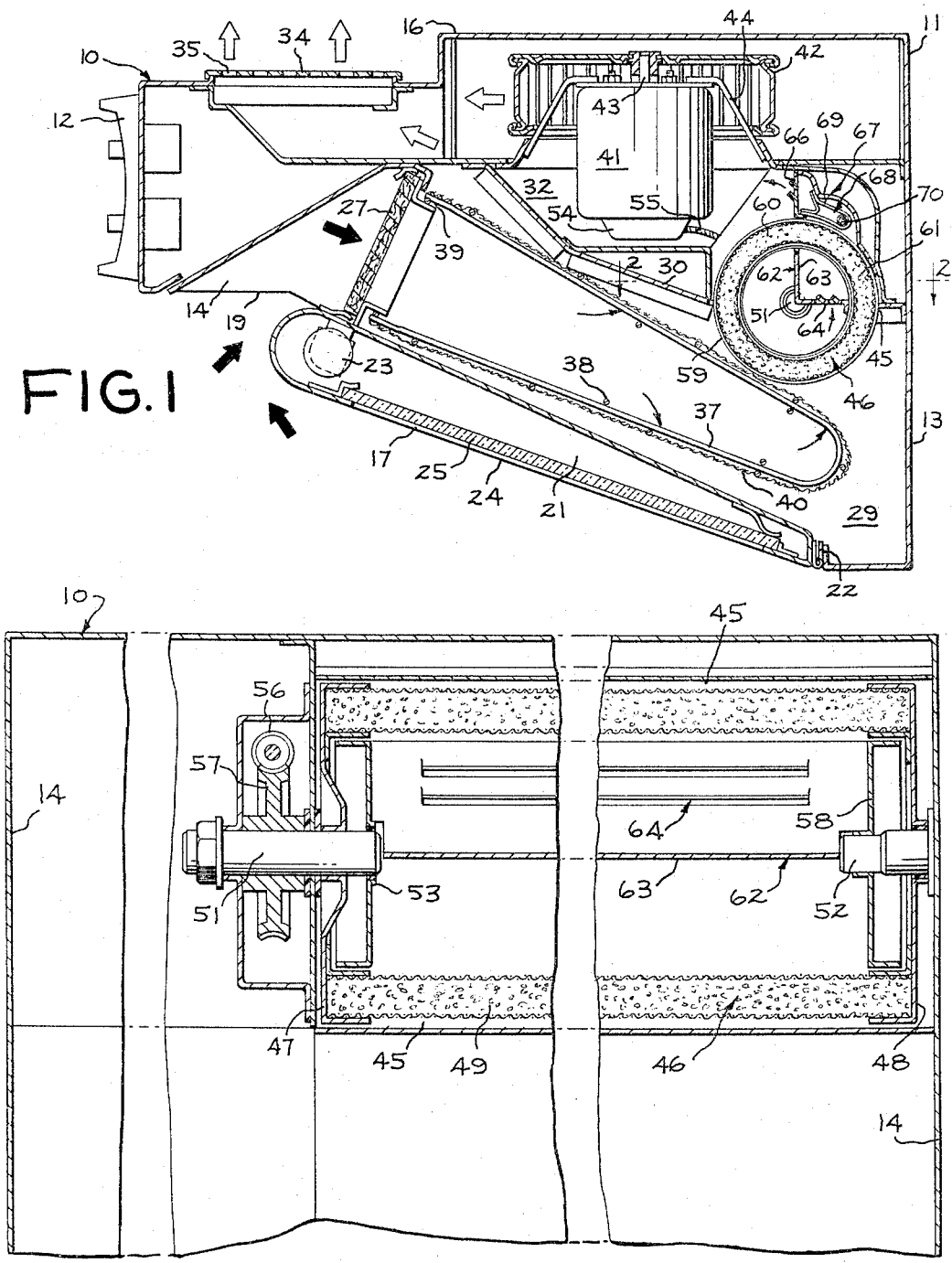

3,381,453
AIR-HANDLING DEVICE WITH REGENERATIVE
FILTER MEDIUM
Raymond L. Dills, Louisville, Ky., assignor to General
Electric Company, a corporation of New York
Filed June 17, 1966, Ser. No. 558,368
2 Claims. (Cl. 55—208)

ABSTRACT OF THE DISCLOSURE

A recirculating kitchen hood that is adapted to be located above a cooking appliance for drawing smoke, odors, grease and water vapor into the hood for collecting these contaminants from the air and returning the purified air to the kitchen atmosphere. The hood includes a smoke and odor absorber in the form of a slowly powered rotatable drum having longitudinal walls supporting a regenerative filtering medium. A quarter segment of the drum is partitioned off internally and externally to form a heated cavity. Within the heated cavity is an oxidation unit for cleaning the filtering medium and oxidizing the resulting products of combustion before returning the air to the kitchen atmosphere. A fraction of the air within the drum is bled off into the heated cavity to support the combustion of the oxidation unit. Other filtering media may be used in addition to the smoke and odor absorber described above; such as a grease filter and a particulate filter. A blower means is provided for forcing the air through the hood.

---

This invention relates to an air-handling device and particularly one that is provided with a regenerative filter medium, where the filter medium is not only restored during its use, but the smoke, odors and vapors which are formed during the regenerative cycle are consumed. This invention finds its principal use in a recirculating kitchen ventilating hood, but its use is not limited thereto.

It is well recognized that from the consumer's point of view it is preferable to vent a kitchen ventilating hood to the outside atmosphere, but from the manufacturer's point of view it is also apparent that such a vented hood design has only limited demand, because it is largely sold to builders for new home construction. This is true because of the difficulty and high cost of installing a venting system in an existing home. Such remodeling venting installation is especially difficult and expensive in a two-story dwelling. It is recognized that this new home construction market is only a small fraction of the total number of homes existing in this country.

Recirculating kitchen hoods have been available on the market for some years now, but they have not been universally accepted, probably because they have followed too closely the design of vented kitchen hoods, and they must be cleaned at frequent intervals. Part of the difficulty is due to the inability of being able to move a large enough quantity of air through the device, while performing a satisfactory job of cleaning the air. By this is meant that the filter medium tends to become loaded with soil and clog up after a short period of operation. The result might be that the use of a non-vented hood would become more objectionable than having no hood at all.

The principal object of the present invention is to provide an air-filtering medium with means for regenerating the medium and at the same time providing means for disposing of the products of combustion so that clean air may be returned for use within the home.

A further object of the present invention is to provide a recirculating air cleaner with a plurality of filtering mediums in addition to a regenerative filtering medium that is combined with an oxidation means for regenerating the filtering medium as well as eliminating the smoke, odors, and vapors attendant therewith.

A still further object of the present invention is to provide a moving filtering medium in combination with a heated oxidation means whereby the filtering medium is regenerated.

The present invention, in accordance with one form thereof, is embodied in a collector of grease-laden soil that is combined with power means for moving the collector at a slow rate of speed. The collector is provided with a heated oxidation unit that operates within a temperature range between about 300° F. and about 1300° F. for releasing the soil from the collector and degrading the resultant products of combustion before returning the air to the atmosphere.

My invention will be better understood from the following desription taken in conjunction with the accompanying drawing and its scope will be pointed out in the appended claims.

FIGURE 1 is a cross-sectional side elevational view of a recirculating kitchen ventilating hood having a regenerative filter medium embodying the present invention;

FIGURE 2 is a fragmentary cross-sectional plan view on an enlarged scale taken through the lines 2—2 of FIGURE 1 and showing the means for supporting and driving the regenerative filtering medium that is in the form of a charcoal filter drum that is closed at both ends.

Turning now to a consideration of the drawing and in particular to FIGURE 1, there is shown a recirculating air cleaner 10 that comprises a hollow sheet metal housing 11 of boxlike shape having a front wall 12 that also serves as a control panel for a blower motor and a light, a back wall 13, opposite side walls 14 (only one of which is shown in FIGURE 1), a stepped top wall 16, as well as an inclined bottom wall 17. In other words, this recirculating air cleaner 10 is not a hood in the strict sense of the word as it is understood in the present state of the art. A kitchen hood is generally understood to be a bonnet-like affair minus a bottom wall, but having all other walls of a box such as front, back, sides and top. It has been discovered after repeated testing that many kitchen hood designs are of little value in capturing or collecting air that rises from the front portion of a range cooktop, and particularly the front heating elements thereof and directing the air into the filtering and exhaust system of the hood.

This invention of a regenerative filter medium is incorporated in a recirculating hood design that is taught in an earlier patent application of Stanley B. Welch, Serial No. 323,771, filed November 14, 1963, now Patent No. 3,286,445, which is also assigned to the General Electric Company, the assignee of the present invention. An elongated air intake port 19 is located in the bottom wall 17 just beneath the front wall 12 of the hollow housing. Notice that the bottom wall 17 is inclined upwardly from back to front, and that it has been lowered as much as possible without interfering with tall cooking utensils such as coffee pots and kettles that might be located on the back heating units. This yields maximum horizontal air velocities across the cooktop, and the inclined wall serves to direct the air from the rear heating units upwardly and forwardly to the air intake port 19 at the front of the housing.

The bottom wall 17 is formed by a pivoted panel member 21 which is hinged toward the rear thereof by hinge member 22. This panel 21 is hollow to enclose an elongated fluorescent lamp assembly 23. There is a window opening 24 in the underside of the panel and this is adapted to be closed by a movable translucent glass pane 25 so as to afford access to the interior of the panel for the replacement of a fluorescent lamp. The purpose of pivoting the cover 21 is to afford access to the interior of the hood housing as will be better understood hereinafter.

A first filter medium 27 is positioned adjacent the air intake port 19 as for example a grease filter formed of close-mesh expanded aluminum strands. Such a filter is a permanent filtering means which may be removed and washed with soap and water in the kitchen sink for reuse. A large plenum chamber 29 comprises a major portion of the housing 10 and it is located downstream of the first filtering medium 27 and is circumscribed by said filtering medium 27, the cover member 21, the lower portion of the back wall 13, the lower portion of the opposite side walls 14, and a generally horizontal overhead partition 30. The function of this partition 30 is to separate the first plenum chamber 29 from a second plenum chamber 32 which is defined by the partition 30, the upper portion of the back wall 13, the top wall 16 and opposite side walls 14. An air exhaust port 34 from the second plenum chamber 32 is covered by an open grillwork 35. This grillwork has a large number of slotted openings that serve to direct the exhaust air in an upward direction to parallel the front doors of wall-hung cabinets (not shown) under which this air cleaner 10 ordinarily would be mounted.

A second filter medium 37 downstream of the filter 27 is in the form of a particulate filter in the form of a folded sheet or bag of fine fiberglass. There is a large air pressure drop across the entire front of the glass sheet so that the air pressure at any point on the surface of the filter bag is substantially equal. The filter 37 is made up of two main elements; namely, an inner frame 38 of welded wire construction that is formed in an elongated arch shape and provided with a supporting base member or frame 39. A second element is the large sheet of fiberglass 40 that is adapted to drape over the inner wire form 38 as well as to be folded around the edges of the frame 39 so as not to become separated therefrom. This does not mean that the fiberglass sheet closes the two ends of the arched form, although this may be considered desirable by some in the attempt to avoid the need for a folddown means.

An electric motor 41 is vertically mounted within the second plenum chamber 32 by radial straps 44, and there is a motor shaft 43 supporting a blower wheel 42. An elongated opening 45, extending for nearly the entire width of the hood, is formed in the partition 30 towards the rear of the hood. This opening is substantially closed by bodily positioning a filter drum 46 therein. This drum is perhaps best shown in FIGURE 2 as an elongated drum having closed end caps 47 and 48 and wherein the cylindrical portion of the drum is represented by an activated charcoal filter 49 which can be used indefinitely. The end caps 47 and 48 of the drum are mounted on trunnions 51 and 52, respectively which are disposed on the axial center line of the drum so that the drum may be rotated at a slow rate of speed during the operation of the blower motor 41. The lower end of the motor 41 is fitted with a gear box 54 into which is connected a flexible shaft 55 that extends down to the drum 46 and is connected into a worm assembly 56 which cooperates with a worm wheel 57 as is best seen in FIGURE 2. This worm wheel is fastened onto the trunnion 51 so that upon the energization of blower motor 41 there is a greatly reduced speed reduction so that by way of the flexible shaft 55 and worm and worm wheel 56 and 57 respectively the drum wheel turns at a slow rate of speed of about .01 to .10 revolutions per minute. The elongated opening 45 may be considered as dividing the periphery of the drum into a first station 59 that extends into the first plenum 29 for receiving air from the air inlet opening 19 and passing the air through the charcoal filter and into the interior of the drum.

Baffles are also provided for divding the periphery of the drum 46 into a second station 60 and a third station 61. First there is a stationary, internal, angular baffle or divider 62 having an imperforate vertical wall 63 and a perforated horizontal wall 64. The angular baffle 62 has a socket 58 which is forced fitted over the trunnion 52, while on its opposite end it has a bearing plate 53 which is seated on the rotatable trunnion 51. The perforations in the horizontal wall 64 serve to meter air into the third station 61, while the difference between the air entering through the first station 59 and the air that is metered or bled off to the third station 61 is discharged through the second station 60. There is a perforated vertical wall 66 which is an extension of the imperforate wall 63 but above the drum 46.

A hollow housing 67 encompasses the third station 61 so as to funnel the air and discharge it from the third station 61 through the perforated wall 66 to mix with the air passing through the second station for being drawn into the blower wheel 42 and later to be discharged from the outlet opening 34. This hollow housing 67 is provided with a catalytic oxidation unit or smoke eliminator 68 formed by a platinum wire screen 69 that has a catalytic coating. This screen is heated to a high temperature between about 500° F. and 300° F. by a metal sheathed heating unit 70. The heat from this heating element 70 activates or recharges the charcoal 49 in the third station 61 of the drum and this recharged area of the peripheral area of the drum is moved in a counter clockwise direction in FIGURE 1 so as to be present at the second station and filter the air that passes therethrough. An alternative would be to have clockwise rotation of the drum. The perforated wall 64 meters only a slight amount of the total air in the drum through the smoke eliminator so that a relatively low wattage can be used in the smoke eliminator. Admittedly, other types of oxidation units may be used such as replacing the catalytic coated wire screen with a strip or block of corrugated ceramic that is treated with a platinum coating. The net result of this would be to enable the operation at lower temperatures thereby reducing the operable temperature from about 900° F. using a wire screen to about 400° F. using the corrugated ceramic.

Modifications of this invention will occur to those skilled in this art, therefore, it is to be understood that this invention is not limited to the particular embodiments disclosed but that it covers all modifications which are within the true spirit and scope of this invention as claimed.

What I claim as new and desire to secure by Letters Patent of the United States is:

1. A recirculating kitchen hood that is adapted to be located above a cooking appliance for drawing grease, water vapors and smoke into the hood so as to filter out the undesirable components and return the purified air to the kitchen atmosphere, said hood having a hollow housing with an air inlet opening that leads into a first plenum chamber, a grease filter positioned across the inlet opening, a particulate filter medium positioned across the first plenum chamber, a second plenum chamber, an elongated opening joining the first and second plenum chambers, a hollow elongated drum having longitudinal walls supporting a regenerative filter medium of activated charcoal, the opposite ends of the drum being closed to form a hollow drum, the drum being pivotally mounted to fill the said elongated opening, the housing including an air outlet opening, and an air moving means downstream of the drum for causing air flow through the hood, power means for turning the drum at a slow rate of speed, and a combined heating means and oxidation unit arranged adjacent the longitudinal surface of the drum for cleaning soil from the regenerative filter medium and degrading the resultant products of combustion to render the drum self-cleaning and reusable, and a stationary divider located within the rotatable drum but mounted independent thereof and closing a sector thereof in combination with the said combined heating means and oxidation unit, air openings in the stationary divider for bleeding off a fraction of the air within the drum so as to pass this reduced amount of air through the drum and into the oxidation unit to support combustion therein, and exhaust air openings in the oxidation unit for mixing the combustion gases with the air exhausting from the drum.

2. A recirculating kitchen hood having a housing with an air inlet, a smoke and odor absorber comprising a hollow elongated drum having longitudinal wall portions of activated charcoal and closed end walls, power means for turning said drum at a slow rate of speed, and baffles associated with the exterior of the drum for dividing the outer surface of the drum into a first station for receiving air from the air inlet and passing it through the charcoal and into the interior of the drum, a second station for exhausting most of the air from the drum as it passes through the charcoal a second time, and a third station which is provided with an oxidation unit for reactivating the charcoal as well as cleaning the products of combustion from the air stream, and a stationary divider located within the rotatable drum but mounted independent thereof and closing off a sector thereof in cooperation with the oxidation unit, air openings in the stationary divider for bleeding off a fraction of the air within the drum so as to pass this reduced amount of air through the charcoal and into the oxidation unit to support combustion therein, and exhaust air openings in the oxidation unit for mixing the combustion gases with the air exhausting from the second station of the drum, and an air outlet opening from the hood, an air flow producing means for moving the air into and out of the hood, the said drum being rotated in a direction counter to the order of the first, second and third stations so that a relatively clean segment of the drum is present in the second station after having been treated earlier at the third station.

References Cited

UNITED STATES PATENTS

| | | | |
|---|---|---|---|
| 1,481,221 | 6/1924 | Nuss | 55—78 |
| 1,814,028 | 7/1931 | Egli | 55—390 X |
| 2,211,812 | 8/1940 | Colbert. | |
| 2,488,553 | 11/1949 | Orner | 34—416 X |
| 2,756,121 | 7/1956 | Grimes | 252—416 X |
| 2,809,025 | 10/1957 | Pettyjohn | 34—82 X |
| 2,815,427 | 12/1957 | Schaefer. | |
| 2,846,557 | 8/1958 | Schulze et al. | 126—299 X |
| 2,889,007 | 6/1959 | Lunde. | |
| 3,085,348 | 4/1963 | Adey et al. | 34—82 X |
| 3,131,687 | 5/1964 | Kalla. | |
| 3,132,006 | 5/1964 | Brucken | 34—82 X |
| 3,134,652 | 5/1964 | D'Angelo et al. | 34—80 X |
| 3,150,105 | 9/1964 | Ledding | 252—416 |
| 3,164,445 | 1/1965 | Hampel | 126—299 X |
| 3,233,391 | 2/1966 | Olsen | 55—294 X |
| 3,286,445 | 11/1966 | Welch | 55—350 |
| 3,306,596 | 2/1967 | Hollowell | 55—466 X |

HARRY B. THORNTON, *Primary Examiner.*

D. TALBERT, *Assistant Examiner.*